Sept. 8, 1964  O. E. LIND, JR., ETAL  3,147,682
CAMERA FOCUSING MOUNT
Filed Nov. 14, 1960  12 Sheets-Sheet 1

INVENTORS
ORBIE E. LIND, JR.
MAURICE K. CARR

BY Strauch, Nolan & Neale
ATTORNEYS

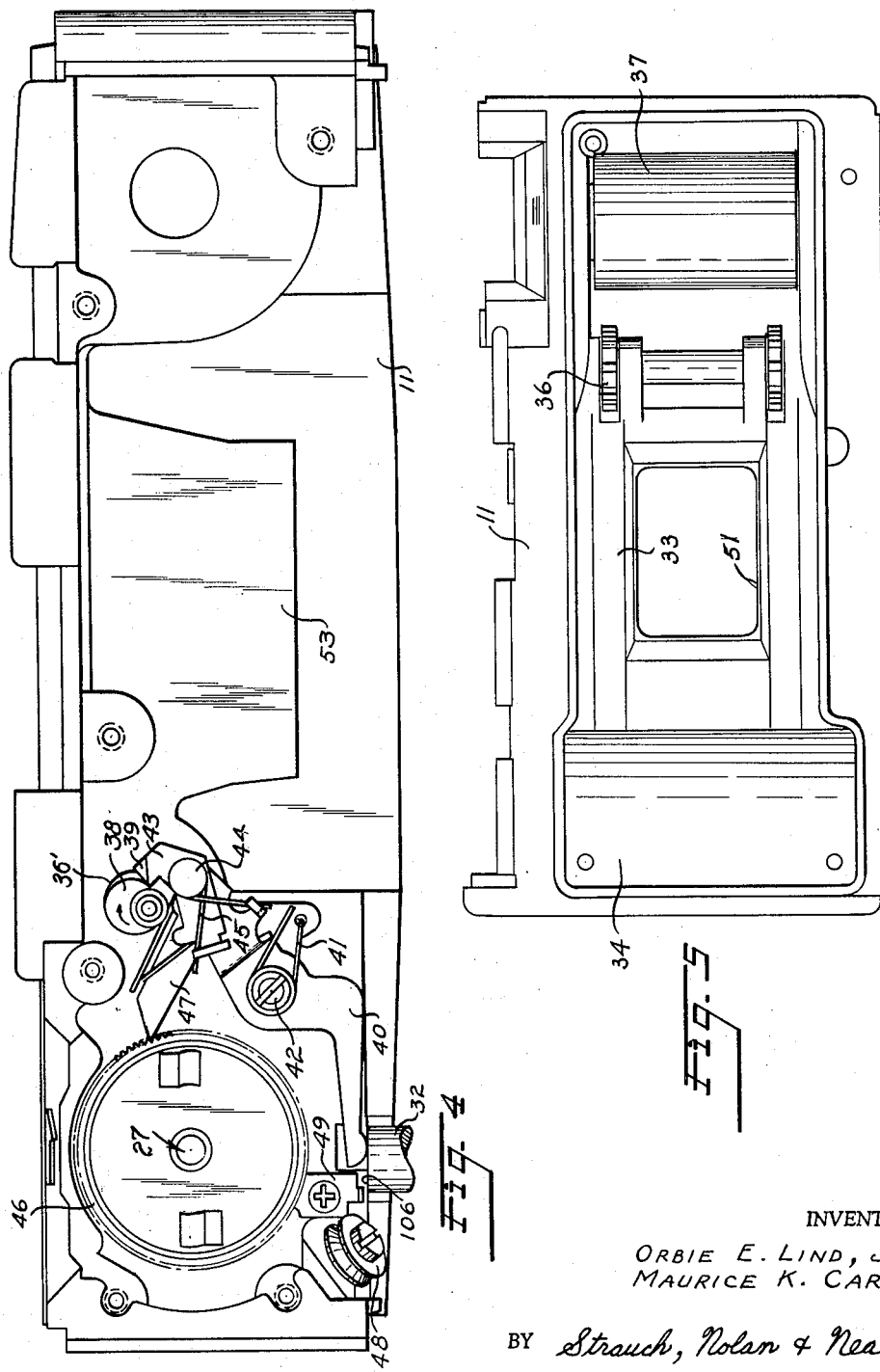

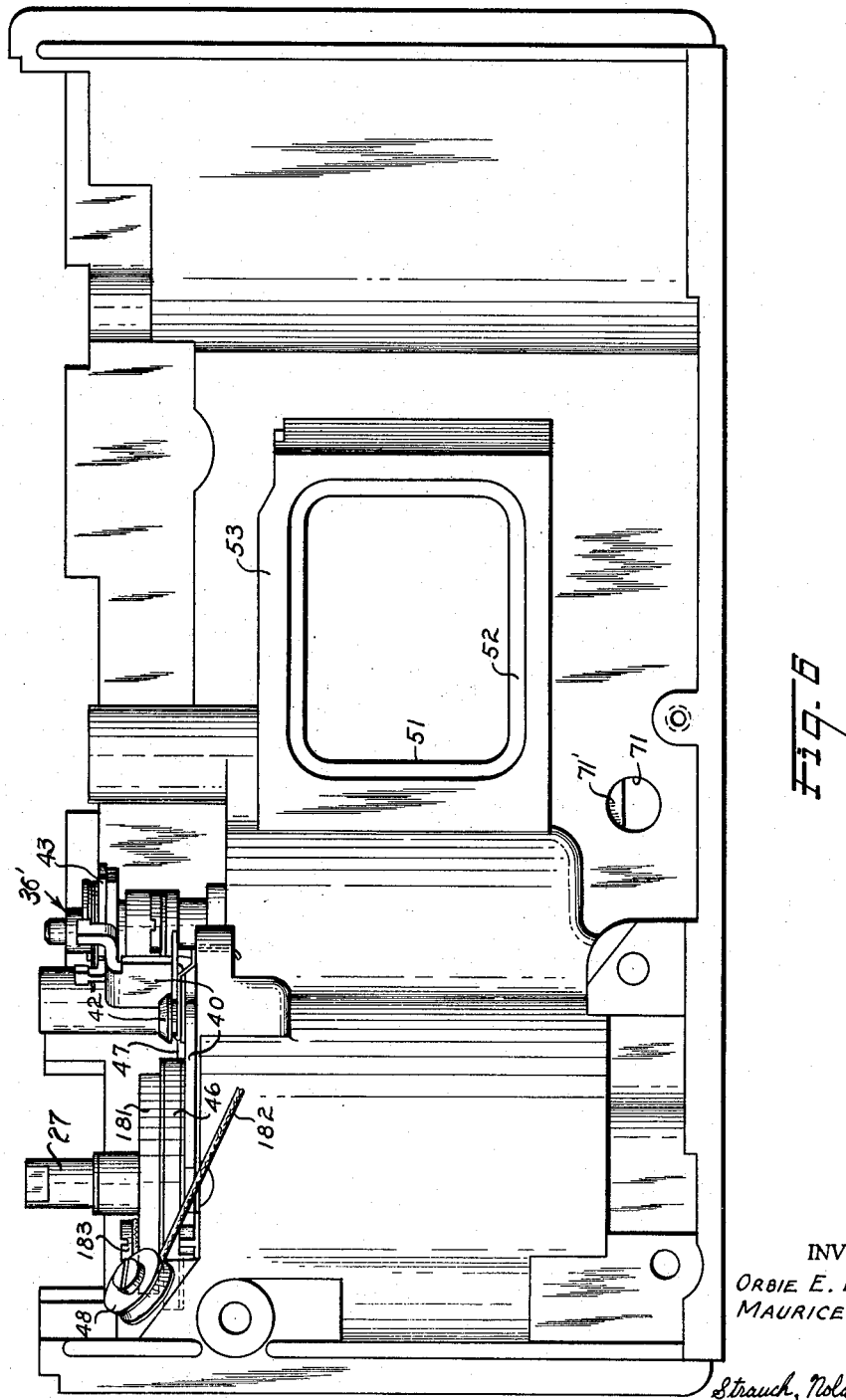

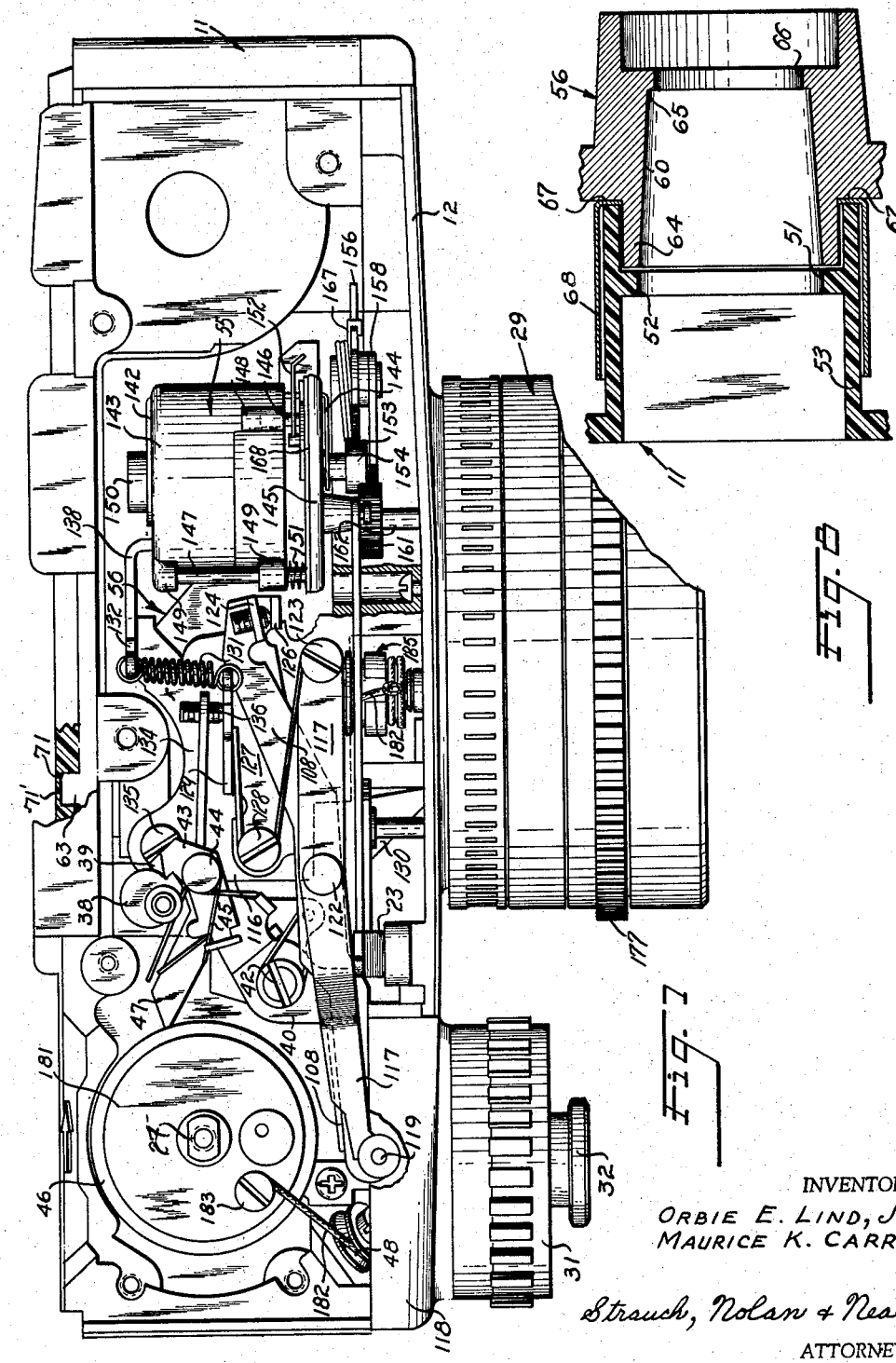

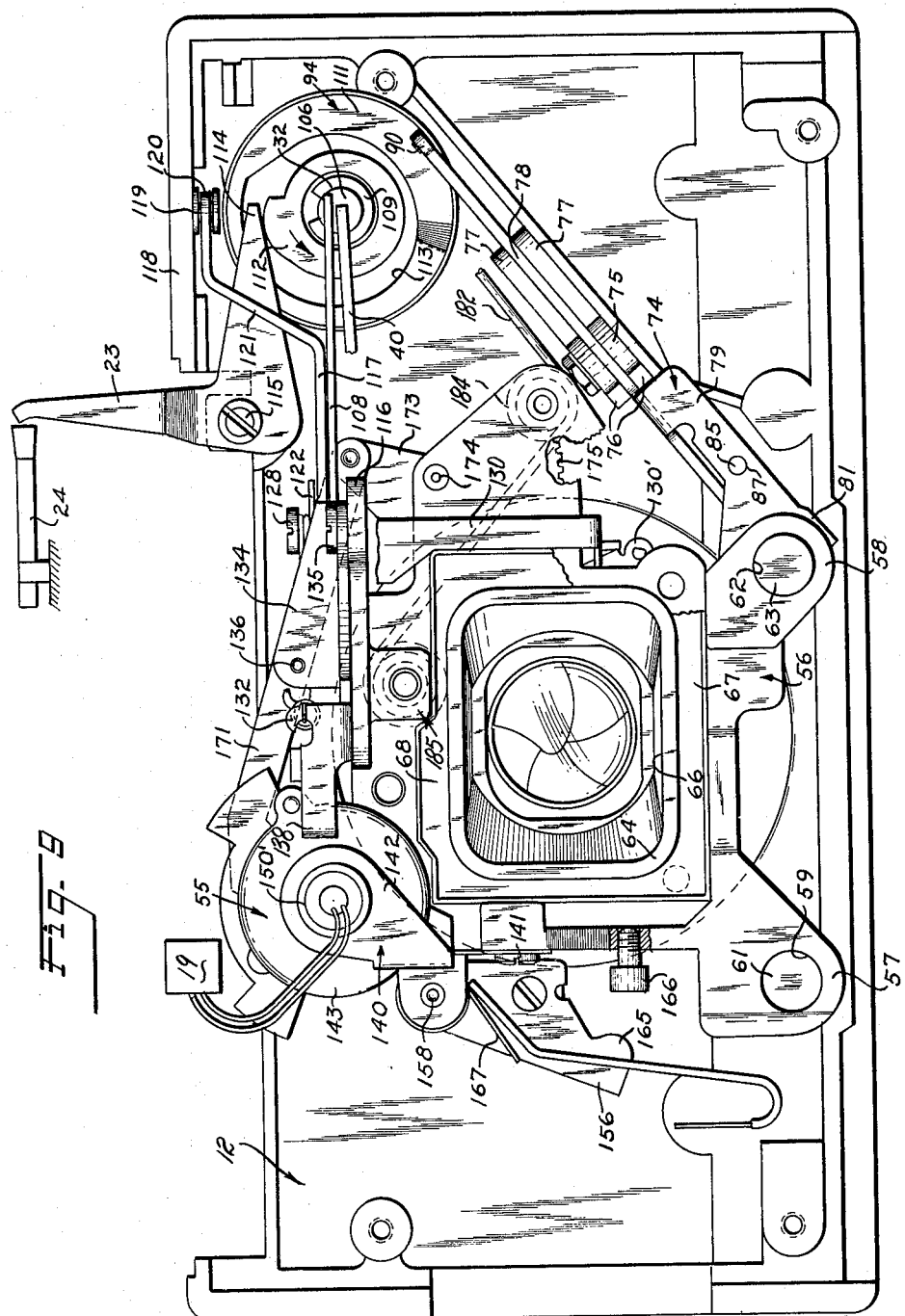

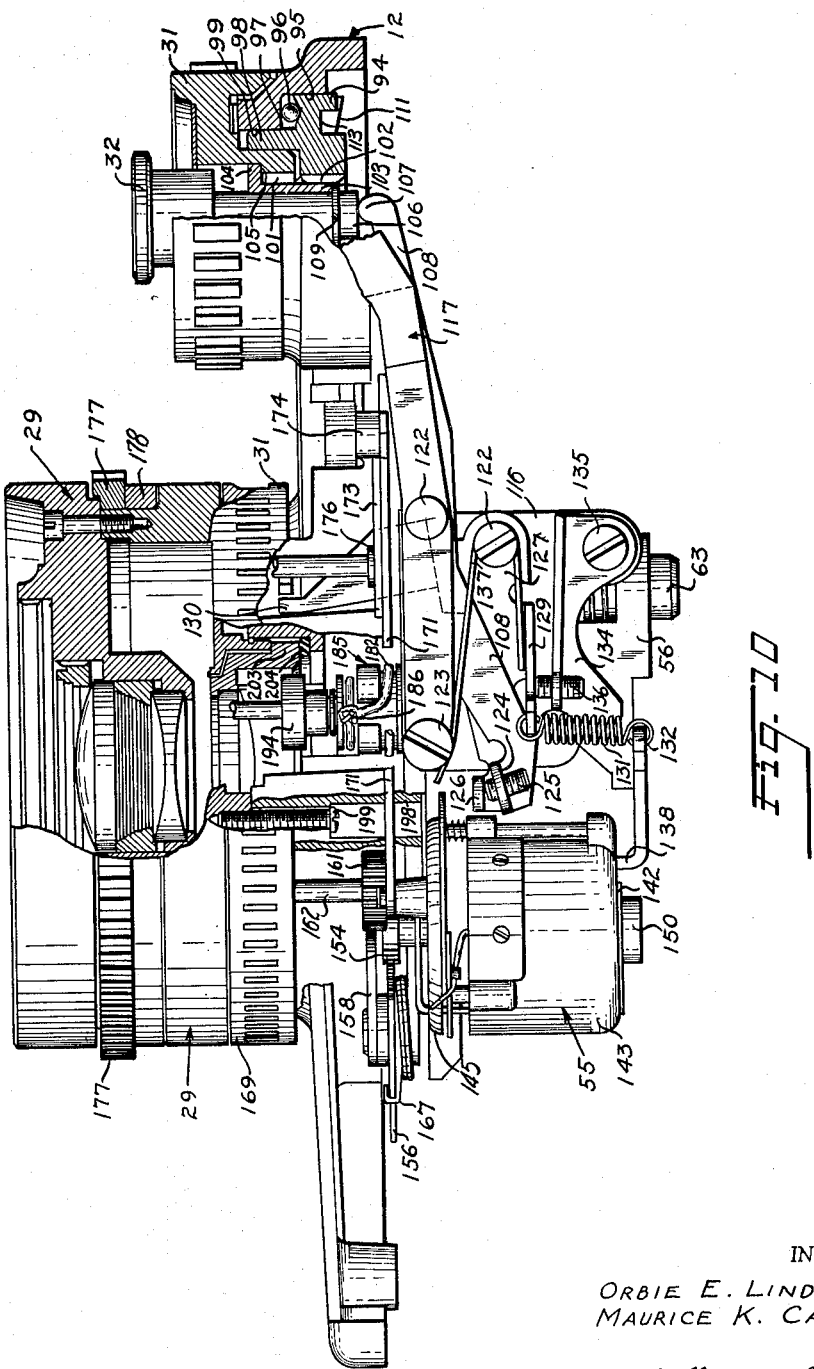

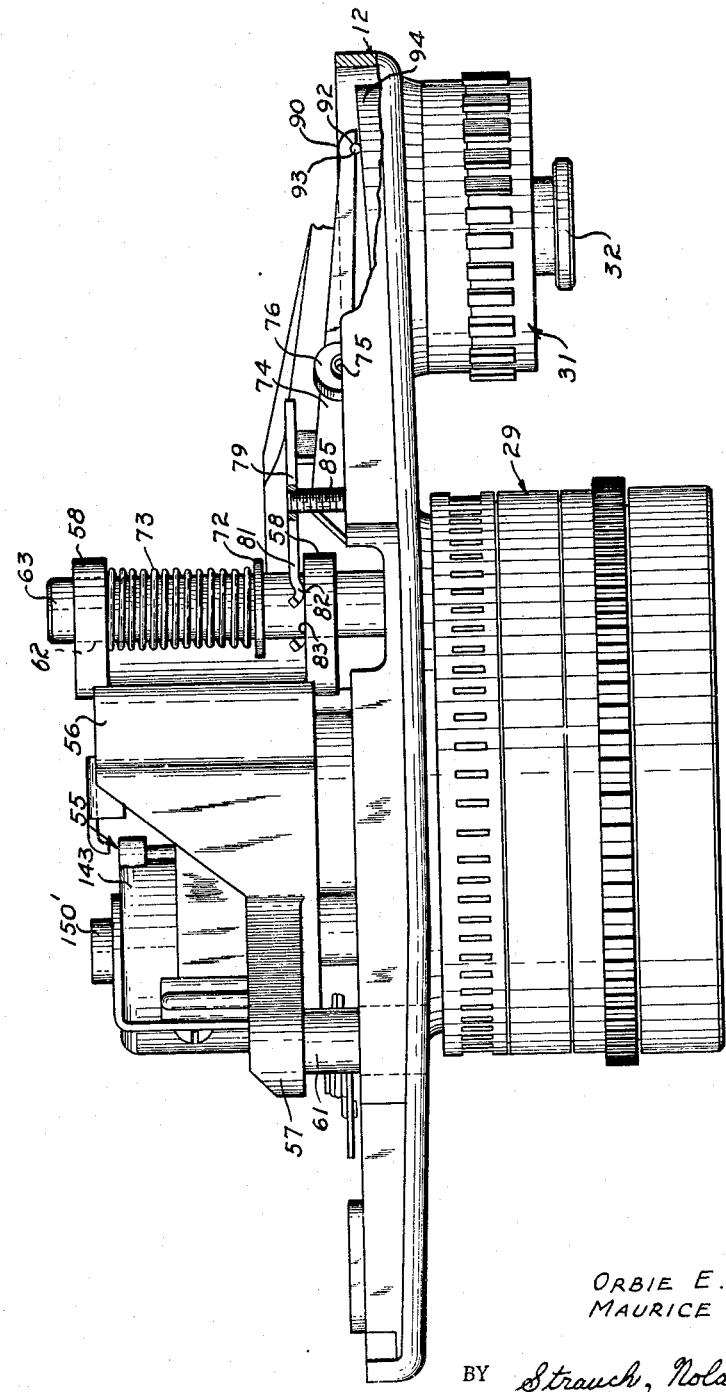

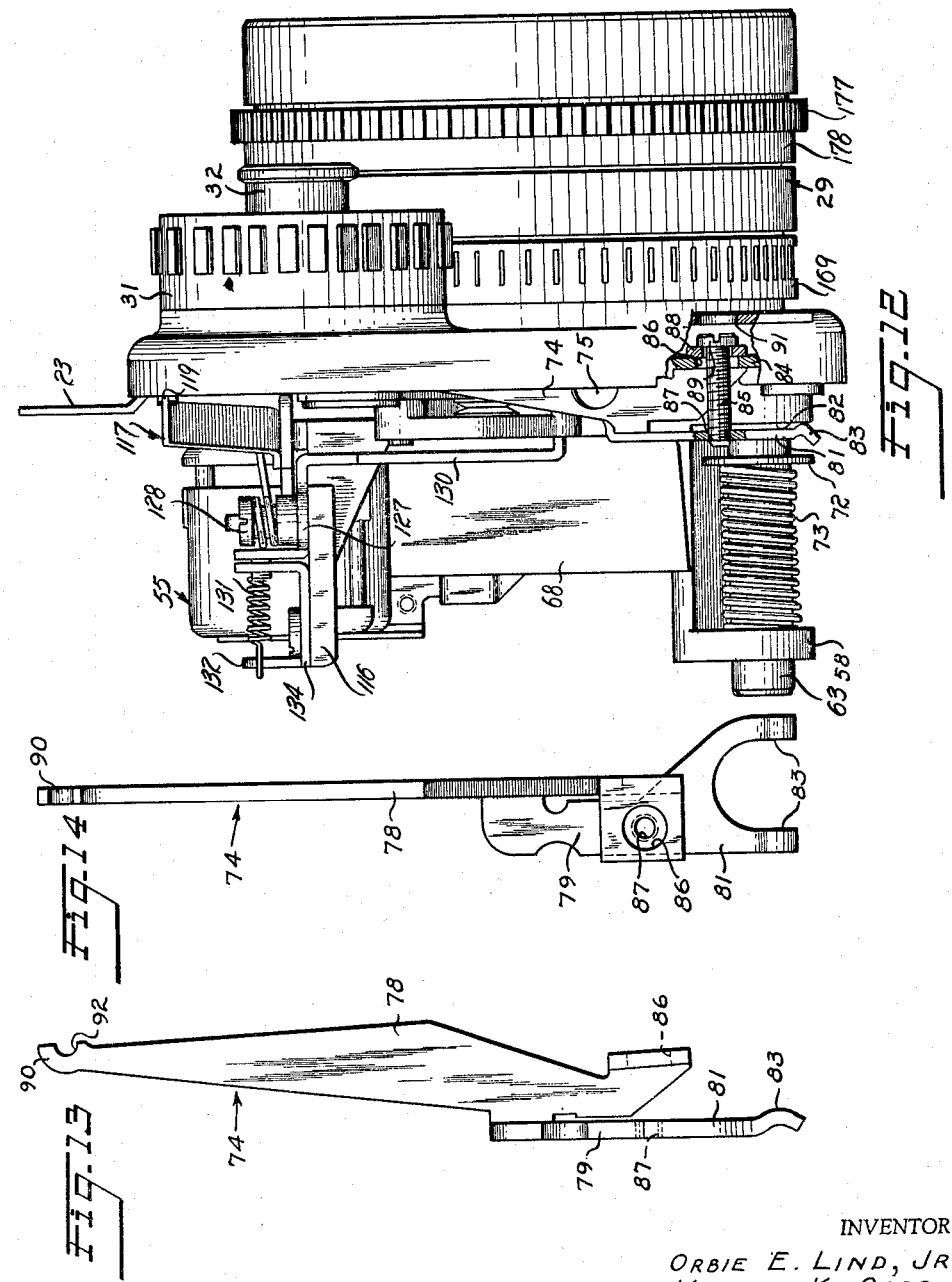

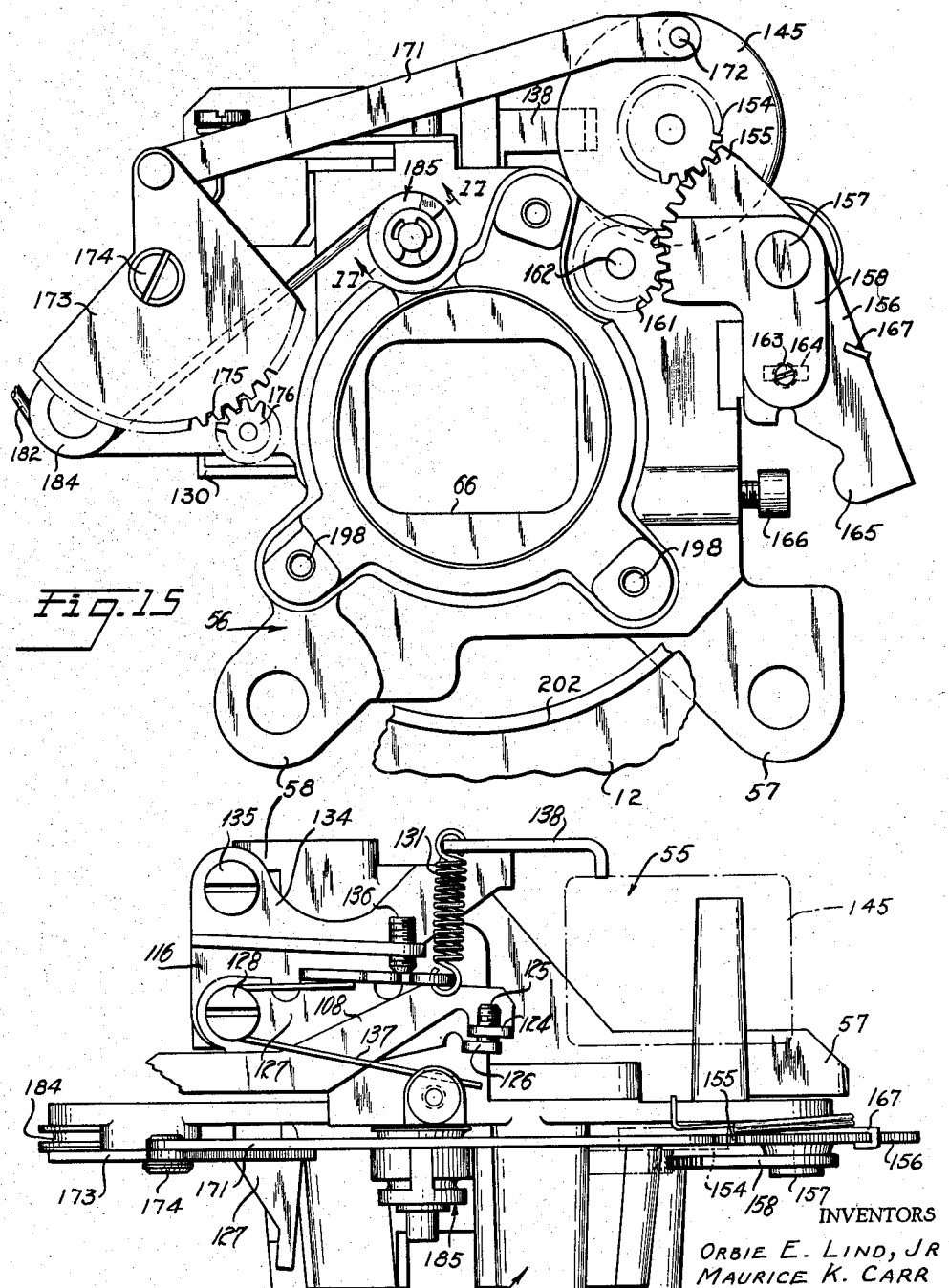

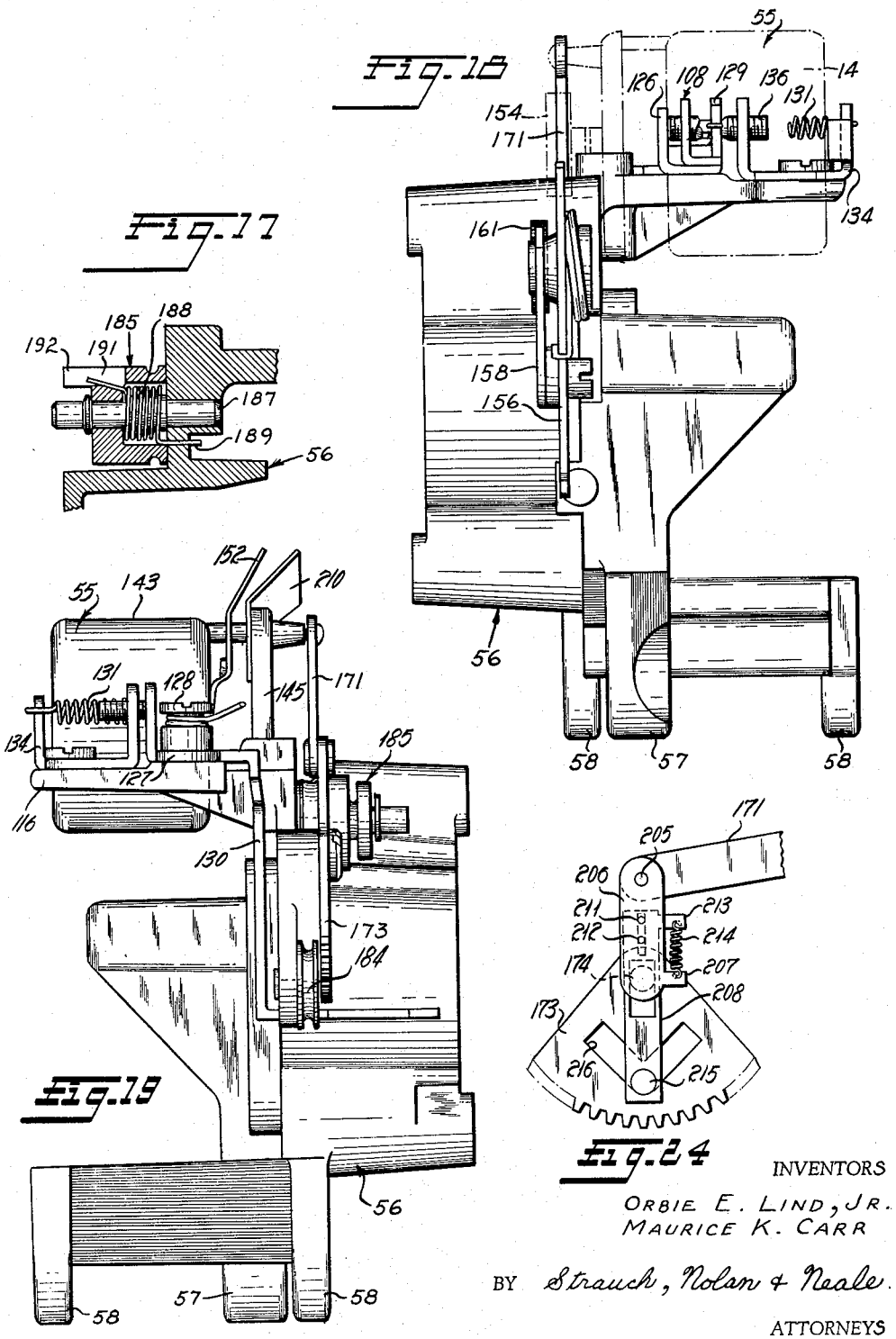

Sept. 8, 1964     O. E. LIND, JR., ETAL     3,147,682
CAMERA FOCUSING MOUNT
Filed Nov. 14, 1960     12 Sheets-Sheet 11
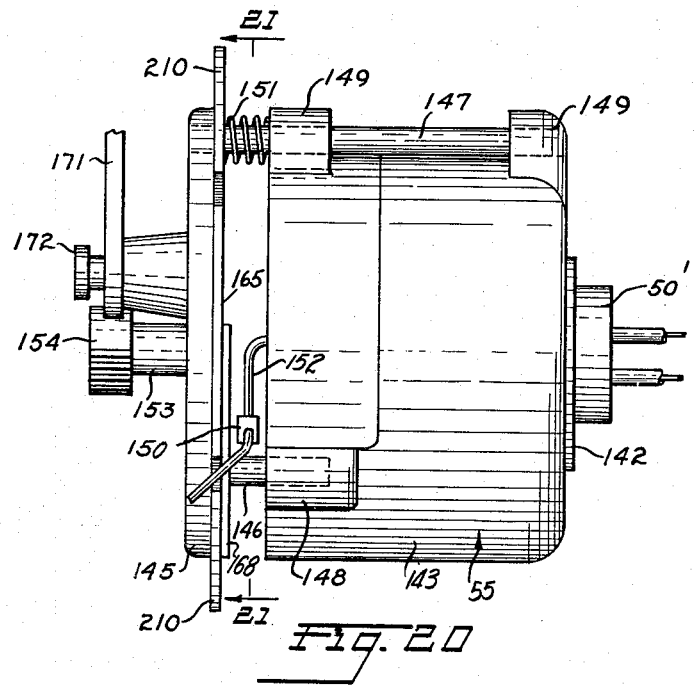
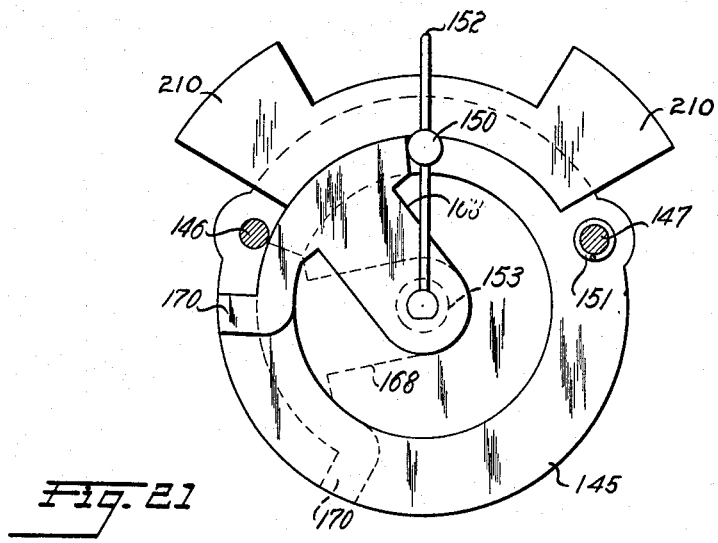
INVENTORS
ORBIE E. LIND, JR.
MAURICE K. CARR
BY *Strauch, Nolan & Neale*
ATTORNEYS Sept. 8, 1964 O. E. LIND, JR., ETAL 3,147,682
CAMERA FOCUSING MOUNT
Filed Nov. 14, 1960 12 Sheets-Sheet 12
Fig. 22
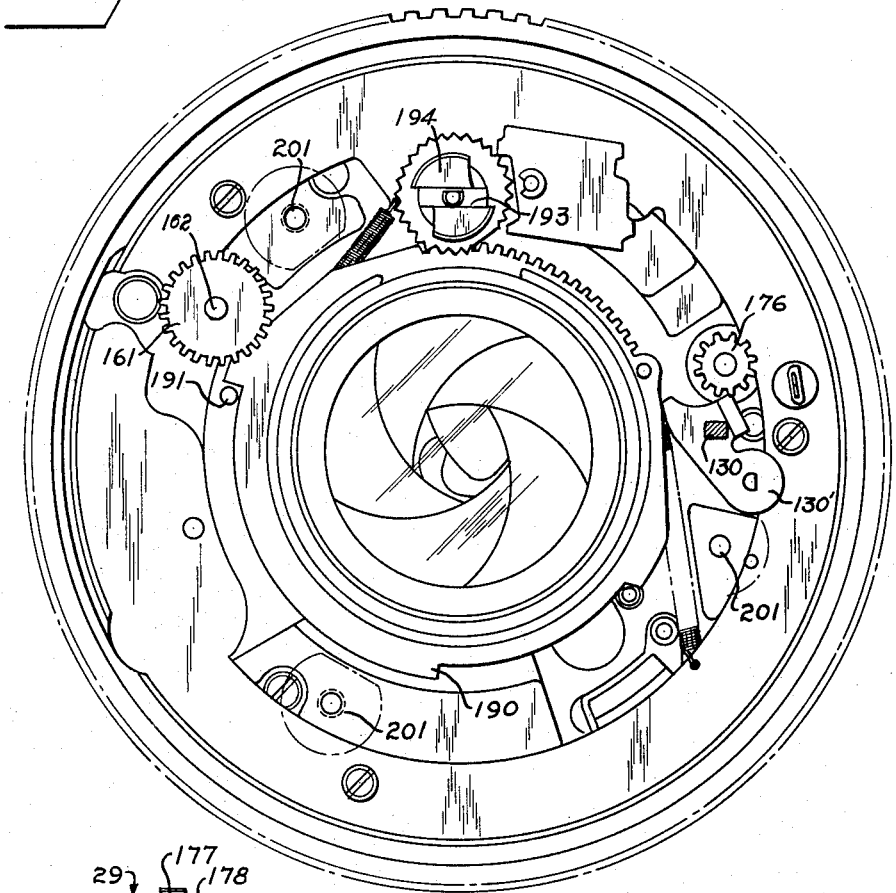
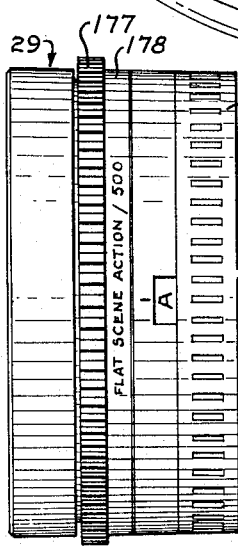
Fig. 23
INVENTORS
ORBIE E. LIND, JR.
MAURICE K. CARR
BY Strauch, Nolan & Neale
ATTORNEYS

United States Patent Office 3,147,682
Patented Sept. 8, 1964

3,147,682
CAMERA FOCUSING MOUNT
Orbie E. Lind, Jr., and Maurice K. Carr, Ann Arbor, Mich., assignors, by mesne assignments, to Argus Incorporated, a corporation of Delaware
Filed Nov. 14, 1960, Ser. No. 68,965
9 Claims. (Cl. 95—45)

This invention relates to photographic cameras and particularly to the control of focusing mounts therefor especially for automatic exposure control cameras.

The present invention contemplates a camera wherein the lens assembly, which comprises an iris diaphragm and a between-the-lens shutter, is mounted on a focusing mount which translates during focusing with respect to the camera body. The photocell operated exposure meter may thus be mounted on the focusing mount and directly connected to the diaphrgam by means not disturbed by focusing of the lens.

It is therefore a major object of the invention to provide a novel and economical manner of mounting the focusing mount carrying the lens, shutter, diaphragm and meter assemblies for accurate precise translation with respect to the film in the camera.

It is a further object of the invention to provide a novel camera wherein the focusing mount is slidably mounted at the rear side of an opening in the front wall of a camera and the lens and shutter assembly is secured to the focusing mount and projects forwardly of the opening.

A further object of the invention is to provide a novel camera wherein the focusing mount carrying the lens assembly is slidably mounted on at least one post at the rear of the front wall and a control lever pivoted on the wall has one end engaged with the focusing mount and the other end engaged with a focusing control member such as a cam rotatable in the front wall.

Another object of the invention is to provide a novel manner of controlling focusing adjustment of a mounting member carrying the lens and shutter in a camera wherein the member is spring loaded in one direction and shifted in the other direction by a lever pivoted on the camera and bearing at its other end on a focusing cam.

Another object of the invention is to provide in a camera a novel coupling between a lens focusing system member and a range finder adjustment member wherein the members are actuated at the same time by a composite cam and wherein the controlling cam surfaces for the respective members are in fixed relative position.

Further objects of the invention will appear as the description proceeds in connection with the appended claims and the annexed drawings wherein:

FIGURE 4 is a top plan view of the camera body with certain control members illustrated in position;

FIGURE 5 is a rear view of the body with the back cover removed to show the relative location of parts;

FIGURE 6 is a front elevation of the camera body with the front plate removed;

FIGURE 7 is a top plan view of the front plate assembly assembled with the body;

FIGURE 8 is a fragmentary sectional view showing the interfitting relationship of the body and the focusing mount at the exposure aperture;

FIGURE 9 is a rear elevation of the front plate assembly showing the focusing cam and lever, the release lever system and the coupling to the range finder;

FIGURE 10 is a top plan view partly in section of the front plate assembly of FIGURE 9 showing the focusing lever and meter clamping system;

FIGURE 11 is a bottom plan view of the front plate assembly of FIGURE 9 showing the focusing mount guide;

FIGURE 12 is a side elevation of the front plate assembly of FIGURE 9 showing the focusing mount and lever system;

FIGURES 13 and 14 are side and plan views respectively of the focusing lever;

FIGURE 15 is a fragmentary front view of the focusing mount with the meter and control linkage attached and with the lens assembly removed;

FIGURE 16 is a top plan view of the assembly of FIGURE 15;

FIGURE 17 is a fragmentary view in section on line 17—17 of FIGURE 15 showing the cable pulley structure;

FIGURES 18 and 19 are opposite side views of the assembly of FIGURE 15;

FIGURE 20 is an enlarged plan view showing the meter mount and assembly;

FIGURE 21 is a section substantially on line 21—21 of FIGURE 20 showing the follower blade;

FIGURE 22 is a rear elevation of the detached lens assembly;

FIGURE 23 is a side elevation of the lens assembly; and

FIGURE 24 is a relatively diagrammatic view showing an optional connection between the drive link and the sector arm drive connected to the diaphragm.

Figure 1:
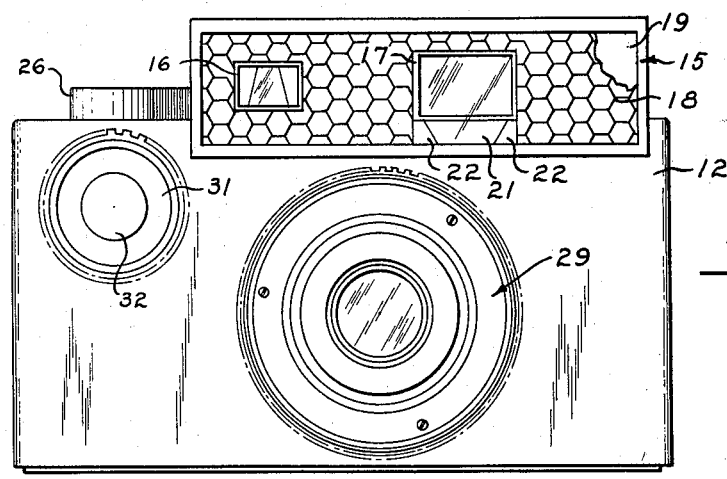
FIGURE 1 is a front elevation o fthe camera showing the focus knob and shutter release button location.
Figure 2:
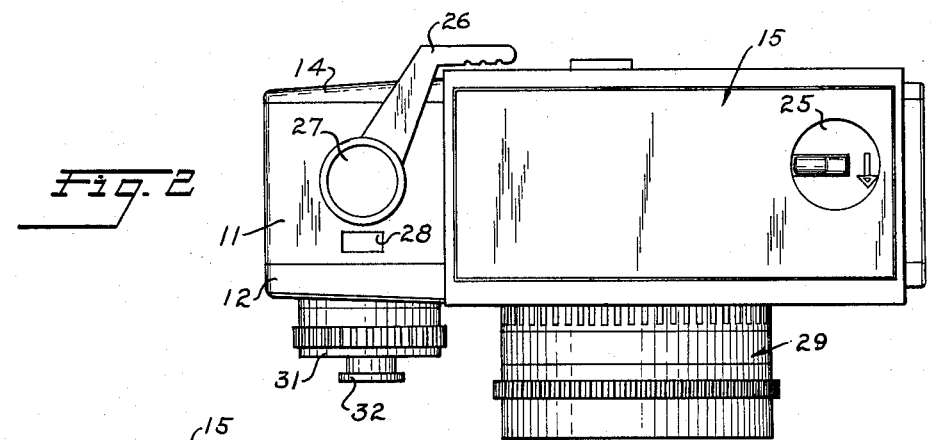
FIGURE 2 is a top plan view of the camera of FIGURE 1.
Figure 3:
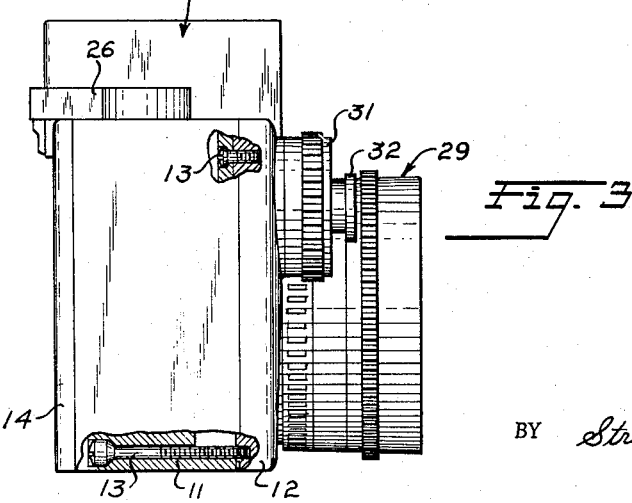
FIGURE 3 is a side elevation of the camera of FIGURE 1.

Referring first to FIGURES 1-3, the camera in which the invention is embodied is of the thirty-five mm. type comprising a rigid body 11 having a front wall 12 detachably secured thereto as by a series of screws 13 (FIGURE 3) accessible to a tool inserted into the body when the back 14 is removed.

At the upper right in FIGURE 1 a box-like frame 15 is detachably mounted on the body 11. Frame 15 contains the usual combined range and view finder mechanism wherein a negative lens is displaced for ranging by operation of a member shifted by the objective lens focus control as will appear.

The front face of frame 15 has the usual spaced finder windows 16 and 17, and a reticulated transparent plate 18 overlying light sensitive means such as a photoelectric cell 19. Below view finder window 17 is an indicator area 21 provided with laterally spaced fixed colored (red) edge areas 22, for a purpose to appear, visible through the finder.

The range finder mechanism, except possibly for the operating crank member 23 (FIGURE 9) which projects up into operative engagement with the pivoted negative lens mount 24 may be conventional, and may be essentially of the structure shown in U.S. Letters Patent No. 2,273,355 issued February 17, 1942.

Frame 15 is also apertured to mount the upper end of a rapid rewind assembly indicated at 25 in FIGURE 1, this assembly being essentially that disclosed in U.S. application Serial No. 755,737 filed August 18, 1958, by Willis H. Beach now matured into U.S. Letters Patent No. 3,061,222 issued October 30, 1962. A rapid wind lever 26 is mounted on a spindle 27 extending into the camera body to drive the usual wind spool within the body. Adjacent lever 26 the body has an aperture 28 to view a film counter.

An objective lens assembly 29 of the type having incorporated diaphragm and shutter assemblies projects away from the front of the camera, and a rotatable control knob 31 for focusing the lens assembly is provided at the upper left front of the camera. The structure of this knob and the coaxial shutter release button that extends axially slidably therethrough will be later explained.

FIGURE 4 shows the body 11 with the frame and other top parts removed, and FIGURE 5 shows the rear of the body with cover 14 removed. In general the film to be exposed passes over guide tracks 33 from a suitable supply reel in chamber 34, over a toothed sprocket 36 which is rotated by engagement with the film sprocket holes, to a take-up spool 37 driven by spindle 27.

Sprocket 36 has a shaft 36' which projects into the upper part of the body and carries a cam 38 (FIGURE 4) coacting with tooth 39 on the end of a sprocket locking lever 40 biased toward the cam by spring 41 and pivoted on the body at 42. A toothed pawl 43 pivoted on lever 40 at 44 is biased toward the cam 38 by spring 45.

A ratchet disc 46 that rotates with take-up spool 37 is prevented from clockwise rotation by a spring biased pawl 47, and a free cable guide pulley 48 is mounted on the body by a bracket 49 near the ratchet disc.

The body 11, which is molded of hard machinable plastic, is formed with a rectangular aperture 51 defined by the internal ledge 52 of a rectangular tubular boss 53 that projects forwardly from the tracks 34. This is an aperture through which exposure is made as will appear. FIGURES 4 and 6 are top and front views respectively of the body 11 as it appears when the front plate assembly of FIGURE 10 is removed from it, and in FIGURE 7 the front plate assembly is attached to the body 11.

The lens assembly 29 and associated focusing mechanism, and the meter assembly indicated at 55 with associated mechanism, are all mounted on a focusing mount 56 which is a rigid generally annular light metal casting formed at its lower corners (FIGURE 9) with integral mounting lugs 57 and 58. Lug 57 has a smooth bore 59 slidably surrounding a short fixed pin 61 rigid with front wall and projecting rearwardly from wall 12 into the body of the camera. Lug 58 is bifurcated (FIGURE 11) with a bore 62 slidably surrounding a longer fixed pin 63 also rigid with and projecting rearwardly from front wall 12. Pins 61 and 63 are parallel to each other and the optical axis.

Centrally casting 56 is formed integrally with a rectangular tubular boss 64 that is internally of slightly reducing taper and through the casting providing a tapered bore forwardly to ledge 65 surrounding an exposure opening 66 therein. Surrounding the base of boss 64 is a generally rectangular annular area 67. A suitable light shield 68 which is a rectangular tube of light sheet material is preferably seated on area 67 and extends rearwardly of the boss 64. In assembly with the body, as shown in FIGURE 8, the boss 64 projects in non-contacting telescoping relation into the interior of body boss 53, and light shield 68 extends telescopingly over body boss 53.

During lens focus adjustment, as will appear, the entire casting 56 moves parallel to the optical axis on pins 61 and 63, and the relative axial dimensions of telescoping bosses 53 and 64 are such that there is no interference with this displacement of member 56 during the entire adjustment range.

The member 56 is entirely supported and guided for reciprocation on pins 61 and 63, the total range of movement being small, and the rear end of pin 63 projects slidably into a shallow internal body bore 71 (FIGURES 6 and 7) where it is rearwardly partially blocked by a web 71'.

Referring to FIGURE 11, an axially solid stop 72 in the form of a snap ring secured in a suitable groove is provided on pin 63 between the bifurcations of lug 58, and a strong compression spring 73 surrounds the pin between stop 72 and the rear leg of lug 58. Spring 73 constantly biases the entire member 56 and everything attached to it rearwardly with respect to front wall 12.

Control of the axial position of member 56 along the optical axis is effected by a focusing lever 74 which is pivoted upon a pin 75 extending between ears 76 upstanding from a pair of spaced guide ribs 77 integral with the rear side of wall 12. Lever 74 at its upper end 78 is a flat stamping extending slidably between ribs 77 which maintain it against lateral displacement as it rocks about pivot 75.

At its lower end 74 is provided with an integral portion 79 bent at right angles thereto and terminating in a fork 81 slidably embracing pin 63 in the space between stop 72 and the front leg of lug 58, and the fork arms have rounded projections 82 slidably bearing against the flat side lug face 83. Lever 74 also has an integral section providing a fixed tab 84 parallel to the fork portion, and an adjustment screw 85 extends through a slot 86 in tab 84 into threaded engagement with the fork at 87. A washer 88 bridges slot 86 and is interposed between tab 84 and the head 89 of the screw which is aligned with access hole 91 in the front wall 12. By means of a screw driver thrust through hole 91 (FIGURE 12) an adjustment of the focusing lever can be effected.

At its upper end lever 74 is formed with a terminal 90 having an edge cavity 92 for receiving a bearing plug 93 of nylon or like good bearing material which slidably bears on the flat track of annular focusing cam 94. This upper end of lever 74 is biased against cam 94 by the force of spring 73 acting through lug 58 upon the forked end of lever 74. Cam 94 (FIGURE 10) is an annulus rotatably mounted in a cylindrical wall bore 95 at the bottom of which is a roller thrust bearing assembly 96 interposed between the cam and an internal shoulder 97 of wall 12, and an annular lip 98 on the cam is journalled in the reduced wall bore 99.

Knob 31 has an internally splined bore at 101, cam 94 has a similar splined bore at 102, and knob 31 is non-rotatably connected to cam 94 by an externally splined bushing 103 which has a forward enlarged flange 104 seated on a recessed shoulder 105 within the knob. Thus when knob 31 is rotated the cam 94 rotates with it.

The stem of release button 32 passes freely slidably and rotatably through the smooth bore of bushing 103 and terminates in a flat face 106 slidably bearing against the rounded end 107 of a release lever 108. Rotation of knob 31 is independent of the shutter button, and reciprocation of button 32 does not affect the focus condition of cam 94. The free end of sprocket locking lever 40 (FIGURES 4 and 9) also bears on face 106 of the stem just below lever 108. A stop 109 in the form of a snap ring in a suitable groove on the stem of button 32 engages the inner end of bushing 103 to limit axial displacement of button 32.

Referring to FIGURES 9 and 10 it will be observed that cam 94 is an integral molded dual cam. It comprises an endless cam face 111 of varying slope against which bears the end of focusing lever 74, and a radial cam 112 formed within an annular recess 113. The lower arm 114 of range finder coupled crank 23 bears against cam 112 under the bias of a spring (not shown) in the range finder system and is confined by the recess 113. Crank 23 is pivoted on wall 12 at 115. Rotation of knob 31 simultaneously pivots crank 23 and lever 74 so that a coupled range finder-focus assembly is provided.

When knob 31 is rotated, cam 94 is rotated and the changing slope of cam face 111 acts to rock lever 74 and produce shift of the entire member 56 including lens assembly 29 along the optical axis to focus the lens assembly relative to the film. At the time, the operator is viewing the subject through the range finder which is coupled through cam 112 and fololwer crank 23. Regardless of the axially adjusted position of the member 56 and the parts on it, the release lever 108 and sprocket locking lever 40 both maintain operative engagement with the inner end 106 of button 32.

Referring to FIGURES 7 and 9, the member 56 is formed with a rigid integral horizontal ledge at 116. A differential lever 117 has a slotted slide pivot connection at 119 to a pin 120 on the underside of a ledge 118 of wall 12 has a downwardly bent section at 121, a free pivot connection to release lever 108 at 122 and an end pivot to member 56 at 123 upon ledge 116. Pivot 122 is located free of and above ledge 116. At its other end release lever 108 is formed with an upstanding tab 124 in which is threaded an adjustable stop screw 125.

The outer end of screw 125 bears against a tab 126 upstanding from an underlying shutter firing lever 127 that is pivoted at 128 on ledge 116. Lever 127 has an upstanding tab 129 which is flexibly connected by a tension spring 131 to a tab 132 intermediate the ends of a clamping arm 134 that swings about a fixed pivot 135 on ledge 116. Spring 131 provides a motion transmitting flexible connection between the firing lever 127 and clamp arm 134, and in addition it keeps the terminal 138 of the clamp arm operatively bearing against the annular relatively slidable rear face of meter housing 143 in all rotative positions of the meter assembly. An adjustment screw 136 threaded in arm 134 bears slidably against tab 129 of lever 127. A linkage biasing spring 137 intermediately coiled on pivot post 128 has one arm bearing against pivot post 123 and the other arm bearing against intermediate lever tab 129.

Lever 127 has an integral extension 130 bent down past the edge of ledge 116 and then forwardly into the interior of the lens assembly to operatively engage a pivoted shutter trip latch control at 130' in FIGURES 9 and 22.

Spring 137 thus urges lever 127 counterclockwise to act through screw 136 to position arm 134 as in FIGURE 10 and to act through tab 126 and screw 125 to rock release lever 108 counterclockwise and maintain the end 107 of the release lever against the end of release button 32.

A U-shaped meter motor mounting bracket 140 is secured upon the side of member 56 as by screws 141 and has a rear leg 142 rotatably and axially slidably supporting the rear boss 150' of th emeter housing 143 and a front leg 144 in which the support plate 145 is journalled in axially spaced relation from the meter. Fixed to plate 145 are parallel guide rods 146 and 147. The shorter rod 146 projects into a slide socket 148 on motor housing 143. The longer rod 147 projects slidably through spaced lugs 149 on the housing 143, and a compression spring 151 urges housing 143 to the rearward position of FIGURE 10. A meter pointer assembly indicated at 152 extends into the space between housing 143 and plate 145. When button 32 is pushed in to make an exposure, the lever system on ledge 116 acts to swing clamp arm 134 clockwise in FIGURE 10 until terminal 138 which abuts the meter housing 143 bodily shifts housing 143 axially toward plate 145 for a purpose to appear, lever 127 is rocked to trip the shutter latch at 130', and lever 40 is rocked clockwise about pivot 42 in FIGURE 7 to release the sprocket.

The location of pivot 122 will change as the member 56 assumes different positions along the optical axis according to the focus adjustment. For example, as member 56 moves rearwardly (away from wall 12) the differential lever 117 will act to shift pivot 122 rearwardly at the same time, the dimensions of the differential lever being such that even though its end 107 maintains the same relation to button 132 the action of release lever 108 upon the clamping arm 134 remains the same regardless of the focus adjustment.

An enlarged button 150 is fixed on pointer 152 in the space between housing 143 and plate 145, and when housing 143 is axially shifted it engages button 150 to press it against plate 145 to clamp the pointer in the current position.

Centrally a post 153 projects rotatably through plate 145 and carries a sector gear 154 meshed with teeth 155 of a rear sector arm 156 (FIGURE 15) pivoted at 157 on member 56. A front sector arm 158 is also pivoted at 157 and has teeth 159 meshed with a gear 161 on the end of a rotatable shaft 162 emerging rearwardly from the lens assembly 29.

Sector arms 156 and 158 are held rigidly together for rocking as a unit about pivot 157 by a clamp screw 163 coacting with a slot 164 in arm 156 for relative angular adjustment of the sector arms in the assembly. At its lower end sector arm 156 has a rounded end 165 adapted to abut against an adjustable stop screw 166 on member 56. Adjacent the inner face of disc 145, post 153 has secured thereto to rotate therewith a thin metal follower blade 168. Spring 167 is effective upon the sector arm 156, 158 to strongly bias post 153, gear 154 and blade 168 as a unit clockwise in FIGURE 21, and engagement of peripheral tab 170 of blade 168 with rod 146 arrests this movement. As will appear spring 167 effects diaphragm closing movement during operation, and the adjustment at 163, 164 thus varies the diaphragm closing action with respect to rotation of the follower 168.

A motion transmitting drive lever 171 (FIGURE 15) is eccentrically pivoted at one end to plate 145 at 172 and pivoted at its other end to a sector arm 173 that is pivoted to the member 56 at 174 and is formed with teeth 175 meshed with a spur gear 176 on a rotatable shaft extending rearwardly from the lens assembly 29. Gear 176 is directly rotated by an internal operative connection to the shutter setting ring 177 of lens assembly 29, and its acts through sector arm 173 and lever 171 to rock the entire meter assembly including disc 145 about the meter axis for a purpose to appear.

A ring 178 is mounted on and normally clamped to rotate with shutter speed adjustment ring 177, but may be released so that shutter speed ring 177 may be rotated with respect thereto to set in a film speed adjustment, this relative rotation being effective through link 171 to also rock the entire meter assembly about its axis.

The shutter within the lens assembly 29 is automatically cocked when the film is wound on the take-up spool. When lever 26 is rocked to rotate the spool 37, it carries with it the rotatable disc 181 (FIGURE 7) to which one end of a flexible nylon or like cable 182 of high tensile strength is eccentrically anchored as by a fastener 183. The cable 182 passes over pulleys 48 and 184, the latter rotatably mounted on member 56 and then up over the sheave of the cable pulley 185 to which it is anchored at 186. As shown in FIGURE 17, the cable pulley is mounted to turn about a shaft 187 fixed on member 56, and a spring coiled about the shaft has one end anchored fixedly on member 56 at 189 and the other end trapped in a slot 191 in the pulley 185, thereby biasing the pulley counterclockwise in FIGURE 15.

Pulley shaft 189 has a projecting lug 192 adapted to enter a slot 193 of a coupling 194 (FIGURE 22) on the shutter cocking shaft at the rear of the lens assembly, so that in the assembled camera when a frame of the film is wound on the spool 37 the cable 182 pulls cable pulley 185 around on its axis to automatically cock the shutter. The parts are spring returned after cocking release.

The internal mechanism of the lens assembly 29 is such that the internal cocking ring 190 (FIGURE 22) is rotated through coupling 194 and acts during the cocking operation to pick up pin 191 on the diaphragm ring to rotate the diaphragm ring to open the diaphragm to at least its maximum opening. As the diaphragm opens it rotates shaft 162, gear 161, sector arms 156 and 158 and gear 154 to rock the follower blade 168 counterclockwise in FIGURE 21 to its starting position. It will be observed that the follower blade 168 is directly drive connected to the diaphragm opening and closing means of the lens assembly, so that the follower always bears the same relation to the diaphragm. Now, with the camera pointed at the subject to be photographed so that the photocell energizes the meter 55, the release button 32 is pressed to trip latch 130'.

First the clamp arm 134 is actuated to shift housing 143 to engage button 150 and quickly clamp the pointer 152 in the position it has assumed according to the measured light value. With the pointer clamped by advance of housing 143 toward disc 145, the shutter is then sequentially tripped through lever 127 and latch 130' and as soon as the shutter is tripped the cocking ring (not shown) is spring returned toward initial position. This starts closing movement of the diaphragm which rotates gear 161 and causes clockwise rotation of follower blade 168 in FIGURE 21 until follower 168 abuts and is stopped by contacting with the enlarged button 150 on the clamped pointer as shown in FIGURE 21. This arrests closing movement of the diaphragm and thus determines the open position of the diaphragm for the exposure being made by the sequential opening and closing of the shutter.

Prior to shutter cocking and attendant setting of the diaphragm in wide open position, the spring 167 acts through the sector arms 156, 158 to urge the follower 168 clockwise in FIGURE 21 until the tab 170 engages stop 146. This is the relative position of the follower when housing 143 is in the retracted position of FIGURE 20 and the shutter has not been cocked. The diaphragm is fully closed. When the shutter is cocked the attendant opening movement of the diaphragm results in relative displacement of the follower to the dotted line position of FIGURE 21, this being limited by stop 166. When the exposure is made the diaphragm is freed to move to closed position and spring 167 aids gear 161 in driving the follower 168 clockwise until the follower strikes the button 150 of the clamped pointer 152, thus setting the diaphragm opening for that exposure.

The foregoing holds true for normal operation. However, assuming that the measured light is very low and insufficient to produce a good photograph, in such a circumstance it is desirable to prevent any closing movement of the diaphragm. For that purpose therefore the follower 168 has sufficient arcuate extent that under such low light condition the follower will underlie the pointer, and both the pointer and follower will be clamped by displacement of housing 143. This assures that the best possible exposure under the existing set of exposure conditions will be made, because the diaphragm does not move from its wide open position. The direct positive interconnection of follower and diaphragm assures this desirable action.

The focus mounting member 56 is provided with three equally spaced bores 198 through which extend screws 199 (FIGURE 10) into threaded engagement with corresponding threaded bores 201 (FIGURE 22) in the lens assembly 29. When these three screws are drawn tight they are accessible at the rear of the front plate assembly, the ring 31 on the lens tube is telescoped over the flange 202 which surrounds the opening in the front wall 12, and the end of the inner lens cell at 203 is light tight against a resilient annular washer 204 seated in the focus mount member in front of exposure opening 66. Upon removal of screws 199 the entire lens assembly is speedily separated from the camera, the coupling 194 and pulley 185 having an axially separable connection.

The internal details of the particular lens assembly are not described since they form no part of the present invention. It is only important that the drive to sector 173 be positive from the shutter speed setting adjustment, and that the drive to sector 158 be positive from and to the diaphragm.

During the foregoing described automatic operation the shutter ring is turned to locate the letter A in the index slot (FIGURE 23).

It will be noted that two colored transparent tabs 210 (FIGURE 21) project angularly up from disc 145. These tabs 210 extend up into the view finder at the level of pointer 152 so that the operator may view at the bottom of the field of view in window 16 a clear space over which the pointer travels, flanked by colored spaces. If the pointer appears in either colored space at the sides of the clear area, this is a signal that the light is insufficient or too great for the automatic setting, and to remedy this the operator may merely turn the shutter setting ring 177 in the proper direction until the meter assembly is sufficiently rotated to locate the pointer in the clear space. This feature is disclosed and claimed in the copending application of Orbie E. Lind, Jr., Serial No. 68,968 filed on the same day herewith for Exposure Condition Indication and Warning.

FIGURE 24 shows an embodiment wherein a collapsible joint is provided in the connection between meter plate 145 and the sector arm 173. In this embodiment, drive link 171, instead of being pivoted directly on a sector arm 173, is pivoted at 205 to one end of a link 206 having a lateral tab 207. A link 208 has an intermediate slot 209 by which it is slidably and pivotally mounted on fixed pivot 174 of sector arm 173. Link 206 has two aligned pins 211 extending into a slot 212 in link 208 whereby links 206 and 208 are longitudinally relatively slidable to a limited extent but not relatively rotatable. A tab 213 on link 208 is connected to tab 207 by a compression spring 214.

At the lower end of link 208 a pin 215 slidably projects laterally into the vertex of a symmetrical V-slot 216 in arm 173. It will be observed that spring 214 in tending to expand normally maintains the illustrated longitudinally expanded straight line relationship of links 206 and 208, so that a pull or push by link 171 results in the arm 173 being rocked about the axis 174 just as though the connection was direct as in FIGURE 15.

However, should rotation of the meter assembly encounter such resistance as would fix link 171 against movement, the turning effort on arm 173 will result in collapse of the linkage 206, 208 with link 208 sliding on the pivot 174 and pin 215 relatively sliding up one or the other branches of the V-slot 216. Preferably the parts are so dimensioned and the spring is such that once the pin 215 reaches the end of either branch of the slot 216 the spring tends to maintain the parts in that position and against return movement to the position of FIGURE 24.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a camera having a front body wall formed with an opening at the exposure aperture axis, a mounting member slidably supported on said wall within the body at said opening for displacement parallel to said axis, said slidable support comprising spaced posts rigid with said wall and projecting at right angles thereto through aligned bores in said mounting member, resilient means biasing said mounting member away from said wall, a lens and shutter assembly mounted on said member at said opening and projecting forwardly of said wall, a focusing cam rotatably mounted on said wall, and mechanism operably connecting said cam to said mounting member, said mechanism comprising a lever intermediately pivoted on said wall on an axis normal to the optical axis with opposite ends bearing on said cam and said mounting member.

2. In a camera, a body formed with an opening, a mounting member slidably supported on said body for reciprocation at said opening, a lens assembly carried by said member forwardly of said wall, a shutter assembly incorporated in said lens assembly and having an actuator, a focus control member movably mounted on said body, mechanism interconnecting said mounting member and said focus control member for shifting said mounting member and lens assembly as a unit with respect to said body, a shutter control member movably mounted on said body, and mechanism operably interconnecting said shutter control member and said actuator for operating the shutter assembly in any displaced position of said mounting member.

3. In a camera, a body having a wall, a support reciprocably mounted on said body wall and carrying a lens, diaphragm and shutter assembly extending forwardly of said wall, means for shifting said support for focusing the lens, a manually operable focusing member movably mounted on said body, lever means operably interconnecting said focusing member and said support, a movable shutter release member on said camera body, and a motion transmitting linkage system operably interconnecting said member and a shutter control element in said assembly in all adjusted focus positions of said support, said focusing member being a cam on said wall rotatable about an axis parallel to the optical axis of said lens, and said lever means comprising a lever pivoted on said wall on an axis substantially perpendicular to the lens axis bearing at one end on said cam and at its other end on said focusing member.

4. In a camera having a lens assembly mounted for reciprocation on its optical axis and incorporating a shutter assembly, means for displacing said lens assembly on said axis for focusing comprising a cam member rotatable on a fixed axis on the camera and operably associated motion transmitting linkage, and means for actuating said shutter assembly comprising a release member slidable coaxially through said cam member and associated motion transmitting linkage extending between said member and the shutter assembly.

5. In the camera defined in claim 4, a range finder actuating lever movably mounted on said camera, and means on said cam member controllably shifting said lever to couple focusing of the lens assembly with the range finder.

6. In the camera defined in claim 4, a sprocket rotated by film in the camera, locking means for arresting rotation of said sprocket after a predetermined length of film has been advanced, and lever means actuated by said release member for disabling said locking means when an exposure is made.

7. In a camera, a body having a wall, a support reciprocably mounted on said body wall and carrying a lens, diaphragm and shutter assembly extending forwardly of said wall, means for shifting said support for focusing the lens, a manually operable focusing member movably mounted on said body, lever means operably interconnecting said focusing member and said support, a movable shutter release member on said camera, and a motion transmitting linkage system operably interconnecting said member and a shutter control element in said assembly in all adjusted focus positions of said support, said focusing member being a cam rotatable on said wall about an axis parallel to the optical axis of said lens, and said shutter release member being a button slidable through said cam into the interior of said body.

8. In a camera having a body formed with an opening, a focusing mount, means slidably mounting said focusing mount on said body at said opening comprising cooperating slide guide means on the body and said focusing mount, resilient means biasing said focusing mount in one direction, a focusing cam member rotatable about a fixed axis on the body, and a lever pivoted on said body with one end bearing on said cam member and the other end operatively engaged with said focusing mount, said guide means comprising a rigid post on said body and a bore in the focusing mount slidably receiving said post, said bore extending through spaced lugs, means providing an axial stop on said post spaced from one of said lugs, and said resilient means being a compression spring extending between said stop and the other lug.

9. In a camera having a body provided with a front wall, a focusing mount carrying the lens, shutter and diaphragm slidably mounted on said body for movement toward and away from said wall, a rotatable focus control cam on said body, the axis of said cam being parallel to the lens axis, a lever pivoted intermediate its ends on said wall and slidably bearing at opposite ends on said cam and said focusing mount, and resilient means biasing said focusing mount into engagement with said lever and said lever into engagement with said cam, said slidable mount for said focusing mount comprising at least three posts rigidly projecting from said wall through bores in said focusing mount, said resilient means being a spring compressed between said focusing mount and one side of a stop on one of said posts, and said lever having a bifurcation embracing said post and engaging said focusing mount adjacent the other side of said stop.

References Cited in the file of this patent
UNITED STATES PATENTS

| | | |
|---|---|---|
| 2,153,813 | Pritschou | Apr. 11, 1939 |
| 2,231,730 | Mihalyi | Feb. 11, 1941 |
| 2,353,227 | Drotning | July 11, 1944 |
| 2,693,745 | Muller | Nov. 9, 1954 |
| 2,871,723 | Shephard | Feb. 3, 1959 |
| 2,906,185 | Naumann | Sept. 29, 1959 |
| 2,933,028 | Mische | Apr. 19, 1960 |
| 2,945,416 | Fuketa | July 19, 1960 |